United States Patent [19]

Ploeg et al.

[11] Patent Number: 5,711,000
[45] Date of Patent: Jan. 20, 1998

[54] TOPOLOGY VERIFICATION PROCESS FOR CONTROLLING A PERSONAL COMMUNICATION SERVICES SYSTEM

[75] Inventors: David Charles Ploeg, Dunrobin; Sammy John Onsy, Stittsville; Kasper Reinink, Nepean, all of Canada

[73] Assignee: Northern Telecom Limited, Montreal, Canada

[21] Appl. No.: 521,848

[22] Filed: Aug. 31, 1995

[51] Int. Cl.⁶ ................................................. H04Q 7/20
[52] U.S. Cl. ................................ 455/423; 455/422
[58] Field of Search ................ 379/58, 59; 455/33.1, 455/67.1, 403, 422, 423, 446, 502

[56] References Cited

U.S. PATENT DOCUMENTS

| | | | |
|---|---|---|---|
| 5,297,189 | 3/1994 | Chabernaud | 379/58 |
| 5,361,402 | 11/1994 | Grube et al. | 455/67.1 |
| 5,425,076 | 6/1995 | Knippelmier | 455/33.1 |
| 5,457,737 | 10/1995 | Wen | 379/58 |
| 5,509,051 | 4/1996 | Barnett et al. | 379/59 |
| 5,570,412 | 10/1996 | LeBlanc | 379/58 |
| 5,608,780 | 3/1997 | Gerszberg et al. | 379/58 |

*Primary Examiner*—Dwayne Bost
*Assistant Examiner*—Myran K. Wyche
*Attorney, Agent, or Firm*—C. W. Junkin

[57] ABSTRACT

A topology verification process for controlling a Personal Communication Services (PCS) system which includes a plurality of Cordless Fixed Parts (CFP)s. The process includes mapping the spatial relationships of the CFPs utilizing Received Signal Strength Indication (RSSI) vectors resulting from test signals transmitted between the CFPs, to establish the topology of the system; repeating the mapping process after any disruption of power to the system, and comparing the results. Any significant change in the results, would be highly indicative of a potential change in the geographic area of operation of the system, and can be used to initiate disablement of the system operation.

7 Claims, 1 Drawing Sheet

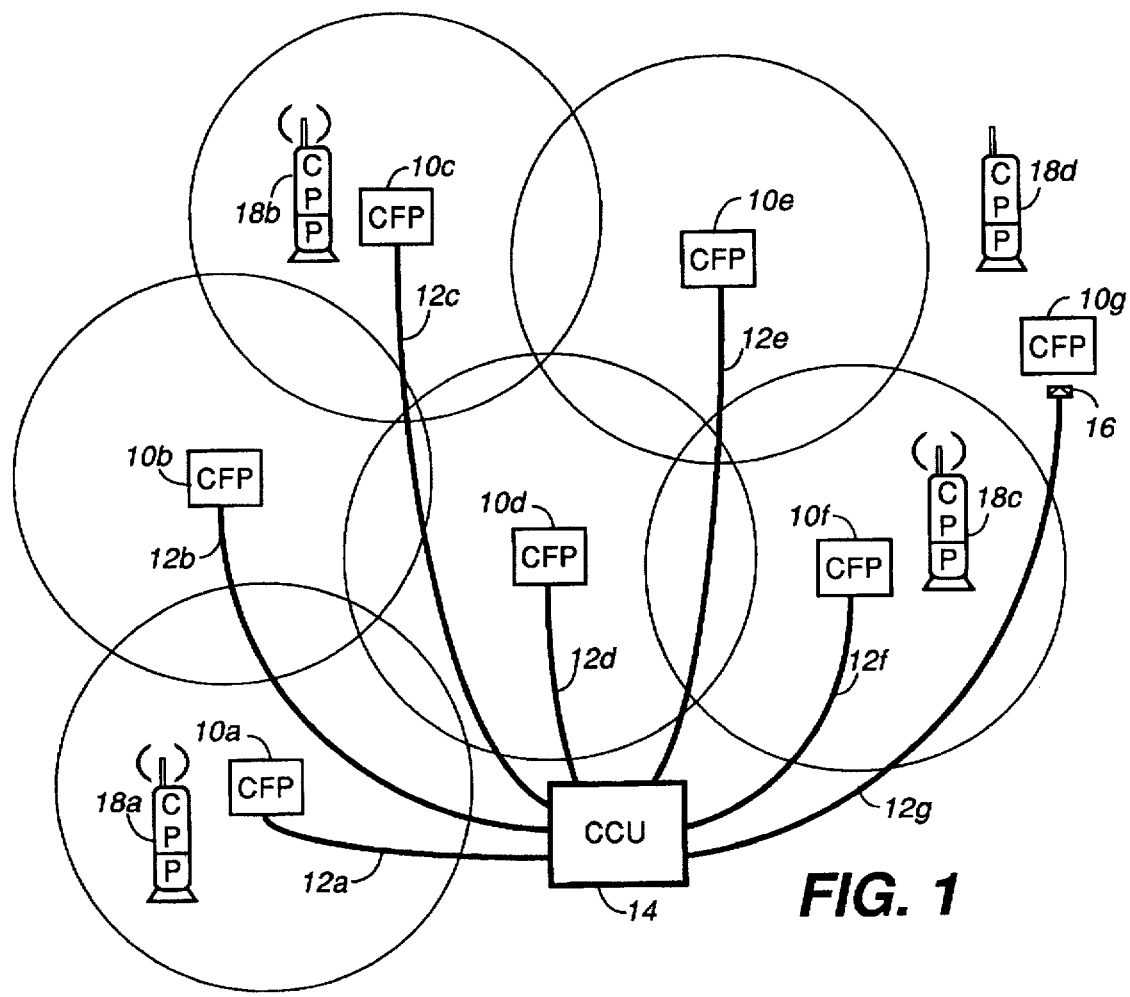
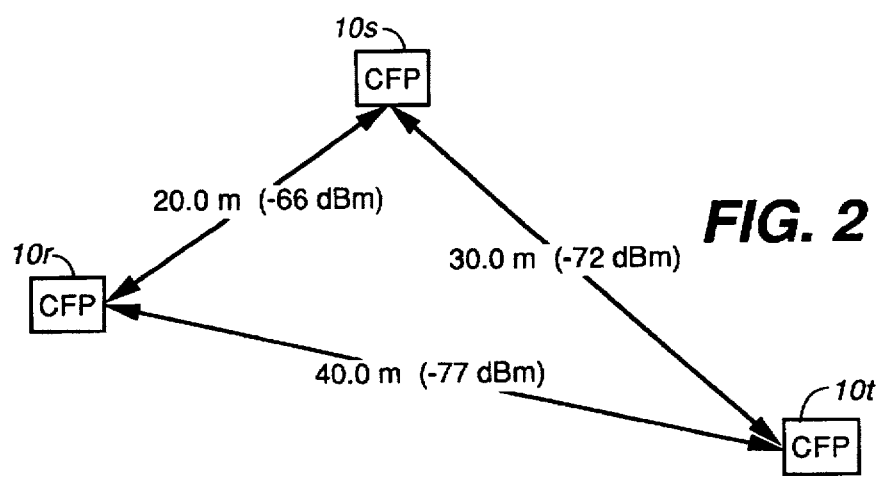

TOPOLOGY VERIFICATION PROCESS FOR CONTROLLING A PERSONAL COMMUNICATION SERVICES SYSTEM

This invention relates to a method for detecting a change in the geographic area of operation of a Personal Communication Services (PCS) system, and more particularly to a process for detecting a change in the system topology which potentially indicates a geographic movement of the system. Detection of such a change can be used to automatically control disablement of the system operation.

BACKGROUND OF THE INVENTION

In the United States, the 1.92–1.93 GHz frequency range has been allocated to Unlicensed Personal Communications Services (UPCS). There are however incumbent microwave users of the 1.92 GHz band who must be protected from potential interference by UPCS radio transmissions. A committee known as UTAM Inc. (Unlicensed Transition And Management for Microwave Relocation in the 2 GHz Band), was formed and given the mandate to ensure that the deployment of UPCS does not interfere with these incumbent users. It also ensures that a new installation cannot be activated, until its location has been coordinated by UTAM Inc., as defined by the rules set forth below.

A UPCS or PCS system is a pico-cellular system which utilizes Cordless Fixed Parts (CFP)s—base stations, and Cordless Portable Parts (CPP)s—portable handsets, that operate with very low radiated power, to communicate with each other.

The Federal Communications Commission (FCC), in the United States of America, has generated a set of rules which require manufacturers to provide 'automatic' mechanisms to detect geographic movement of these systems. It is the responsibility of UTAM Inc. to follow the rules set out by the FCC. Upon detection of such movement, a system must not operate until the new area is verified by a UTAM, Inc. representative.

This is manifest by the following clauses taken directly from the FCC Spectrum Etiquette Part 15 —Subpart D—Unlicensed PCS Devices, which is a regulatory document to which systems and devices must comply. The following are the rules which require automatic provisions to detect movement and disable the systems:

15.307c An application for certification of PCS device that is deemed by UTAM, Inc. to be noncoordinatable will not be accepted until the Commission announces that a need for coordination no longer exists.

15.307d A coordinatable PCS device is required to incorporate means that ensure that it cannot be activated until its location has been coordinated by UTAM, Inc. The application for certification shall contain an explanation of all measures taken to prevent unauthorized operation. This explanation shall include all procedural safeguards, such as the mandatory use of licensed technicians to install the equipment, and a complete description of all technical features controlling activation of the device.

15.307e A coordinatable PCS device shall incorporate an automatic mechanism for disabling operation in the event it is moved outside the geographic area where its operation has been coordinated by UTAM, Inc. The application for certification shall contain a full description of the safeguards against unauthorized relocation and must satisfy the Commission that the safeguards cannot be easily defeated.

15.307h The operator of a PCS device that is relocated from the coordinated area specified by UTAM, Inc., must cease operating the device until coordination for the new location is verified by UTAM, Inc.

These rules: 1) are intended to allow for the coexistence of differing protocols and air-interfaces, from various equipment manufacturers within the UPCS spectrum band; and 2) with respect to UTAM Inc. are intended to protect the microwave incumbents.

Various disablement tests may be utilized to detect movement of the PCS system outside its geographic area of operation. The following is a review of some of these tests:

1. Global Positioning System: Hand held GPS systems are available for the consumer electronic market. Software could be developed to manage the location coordinates and subsequently verify that they have not changed, each time the system is restarted. However, it would be costly to integrate a GPS unit into a hardware packaging and software architecture of a PCS system. Furthermore, GPS units may not function adequately indoors;

2. Time Of Day Clock: The "suggested" UTAM Disablement Test Suite, requires the system to be stored for 8 hours, to simulate the movement from the original location, to the new location. Software could be developed to detect an 8 hour (or greater), power outage. However, when the system does not support a "Time Of Day" clock, and the system is powered down, the system clock stops, and will be restarted at the time of day it stopped at, when the system is powered up at the new location. Hence, the system does not have a concept of elapsed time, when powered down. Furthermore, it is quite possible for the system to be relocated within the 8 hour period. Again, this solution would entail costly hardware enhancements;

3. Mercury Switch: A motion sensitive mercury switch could be attached to a system controller during installation, which would be designed to "break" its contacts, in the event of movement. The contacts could be strategically connected to prevent the system from operating, if they are opened. However, motion sensitivity would be an issue, and again, hardware packaging and security would also be an issue;

4. Correlating Hardware IDs: Every base station is manufactured with a unique "Hardware Identification code". The system maintains information on the "Hardware ID", associated with the physical "Port ID" on the controller, in which the base station has been connected. It is possible to detect "Port ID" and "Hardware ID" mismatches, as a means of inferring that "geographic" movement has occurred, if the customer failed to reconnect the base stations to their original ports, after "moving" the system.

However, it is likely that the customer would carefully label the original ports, where the base stations were connected and would replace them as they were, after a "move". Hence, this scheme would be easily defeated.

In addition, this scheme would be a nuisance when replacing defective base stations, since a new replacement base station will have a different "Hardware ID" and could cause the system to incorrectly determine that "geographic" movement has occurred.

SUMMARY OF THE INVENTION

It has been found that a particularly effective process for detecting geographical movement of the PCS system, and hence the capability for automatically disabling its operation, comprises detecting a change in an RSSI Signature. The RSSI Signature is a topological map of the spatial relationships of a representative cross-section of the CFPs configured in the PCS system. Such a map does not attempt to specifically locate the geographic area of operation of the system. However, because it is virtually impossible to relocate such a system without significantly changing this topological map, a change in the RSSI Signature indicates a change in the system configuration and potentially its geographic area of operation. Detection of such a change can be readily used to automatically control disablement of the system operation.

Thus in accordance with the present invention there is provided a topology verification process for a Personal Communication Services (PCS) system which includes a plurality of Cordless Fixed Parts (CFP)s, each for transmitting and receiving signals therefrom. The process comprises the steps of: transmitting a test signal from different ones of the plurality of CFPs; measuring the Received Signal Strength Indication (RSSI) of the transmitted test signal received by each of the other CFPs to provide a RSSI vector for each CFP; then mapping the spatial relationships of the CFPs relative to each other from the RSSI vector measurements. Repeating the measuring and mapping steps whenever there is a power disruption to the system (or in response to other selected criteria); and then comparing the results to detect significant changes in the topology of the system; such changes being highly indicative of a potential change in the geographic area of operation of the PCS system.

In a particular embodiment of the invention, detection of preselected changes in the topology of the system, initiates automatic disablement of the system.

BRIEF DESCRIPTION OF THE DRAWINGS

An example embodiment of the invention will now be described with reference to the accompanying drawings in which:

FIG. 1 is a block schematic diagram of a Personal Communication Services (PCS) system in accordance with the present invention; and FIG. 2 illustrates a portion of the PCS system shown in FIG. 1, with additional information for configuring the system.

DESCRIPTION OF THE PREFERRED EMBODIMENT

In the following description, similar objects are identified by a basic reference number followed by an alpha character. Only the reference number will be referred to, except when reference to a specific one of the objects is made.

Referring to FIG. 1, the PCS system is a picocellular system which utilizes very low powered transmitters for both base stations and portable handsets within each cell. The PCS system comprises seven Cordless Fixed Parts (CFP)s 10a to 10g (base stations), normally connected to a Central Control Unit (CCU) 14 via a wired infrastructure using twisted pair telephone cables 12a to 12g respectively. However, the CFP 10g is shown disconnected from the CCU 14, at plug 16 located at the end of the telephone cable 12g adjacent the CFP 10g.

In pico-cellular wireless systems, each of the CFPs 10 normally functions as a base station transmitting and receiving signals from a number of Cordless Portable Parts (CPP)s 18a to 18d (portable handsets). The normal transmission and reception limits of each cell are shown diagrammatically by overlapping radiation circles surrounding each of the CFPs 10a to 10f. UTAM, Inc. requires that the maximum distance between any two CFPs 10 be no more than 8000 metres; and that the UPCS system, including the CFPs 10 and the CPPs 18 be coordinatable as stated in the FCC rules of Spectrum Etiquette.

The representative number of CFPs 10 and CPPs 18 illustrated in FIG. 1, is exemplary only and the number of units could be many times that shown. Also, in an operating system, multiple CPPs 18 can operate simultaneously within each cell of the PCS system. Where insufficient channels are available from one CFP 10, the CFP 10 can be readily twinned with another CFP (not shown) within that cell to increase the overall channel capacity. Hand off from one CFP 10 to another, as the CPP 18 moves from one cell to another, is well known in the cellular field. To meet the FCC requirements of a coordinatable PCS device, each CFP 10 will only operate when receiving control signals from the CCU 14. As a result, the CFP 10g is in a disabled state, as it is disconnected at the plug 16 from the CCU 14. This is manifest in the drawing by the absence of a circle representing radio energy radiation, surrounding the CFP 10g.

Of the four Cordless Portable Parts (CPP)s 18, three CPPs 18a, 18b and 18c are active as shown by the radiation lines adjacent to each of them, and transmit and receive signals to and from the CFP 10 within the cell they are currently located. The fourth CPP 18d is shown in an inactive or standby state, as it is not currently within the operating range of one of the active cells. Because the CPPs 18 are also coordinatable PCS devices as required by the FCC, the CPP 18d is unable to initiate any activity that will radiate radio energy, until it receives control signals from one of the CFPs 10.

When the PCS system is initially activated, the CCU 14 executes an initialization sequence to establish and record the system configuration. United Kingdom Patent Application Serial Number 9411665.4, entitled "Automatic Determination and Tuning of Pico-Cell Topology for Low-Power Wireless Systems" filed Jun. 10, 1994 and assigned to Applicant, performs such an initialization sequence. Selected test results (ie: selected vectors) from the recorded system configuration form the basis of the topology verification process. On initial activation, the PCS system is disabled, pending entry of a UTAM assigned activation code or password. After activation, any change in the recorded configuration is indicative of a change in the geographical location of the system and is used to control disablement of the PCS system.

Referring to FIG. 2, three CFPs 10r, 10s and 10t illustrate in detail the topology verification process of the invention. The CFPs 10r and 10s are shown at a distance of 20.0 metres from each other. Likewise devices 10s and 10t are at a distance of 30.0 metres, while devices 10r and 10t are at a distance of 40.0 metres. These would be typical distances between the CFPs in neighbouring cells of the PCS system.

Under free-field operating conditions, transmitted power diminishes as the square of the distance between a transmitter and a receiver. However, under near field conditions, where PCS systems normally operate, such power diminishes significantly faster with the Received Signal Strength (RSS) being greatly affected by any surrounding structure in which the system is housed. Typical recorded results of the received powers (the RSSI levels), for a transmitted power of 10 mW, are shown in brackets after the distances between CFPs 10 in neighbouring cells.

It is important to note that the magnitude of each RSSI vector is not important but its reproducibility over time is, assuming the operating conditions or environment have not changed.

To establish the RSSI Signature during the initialization sequence, each CFP 10 sequentially transmits a test signal under control of the CCU 14. This signal is received by the other devices 10 as shown by the arrows in FIG. 2. The RSSI data received by each CFP device 10, is recorded by the CCU 14 to provide the RSSI vector for that device. The combined vectors for at least a sample number of CFP devices 10, then form the RSSI Signature. When the test is repeated after a power disruption (or other selected interval), the received RSSI data is used to generate an RSSI Test result in a similar manner to that of the RSSI Signature.

This RSSI Test is then compared to the RSSI Signature and if there is a significant difference between the two sets of data, a control signal from the CCU 14 automatically disables all the CFPs 10. Such a difference is highly indicative of a geographic movement of the entire system or at least one or more of the CFPs 10. Even switching the ports of the CCU 14 to which the cables 12 are connected, would result in a discrepancy between the RSSI Signature and the RSSI Test data, which would trigger a shut down of the It will It will be evident that a number of operating parameters can affect these results. These include:

near field conditions;

antenna radiation patterns;

power supply variations in CFPs during the RSSI tests;

noise and interference;

multipath fading;

obstructions within the operating environment;

tolerance in equipment measurement techniques.

It is therefore, essential to establish a threshold level for the "significant" difference, above which the PCS system will be automatically disabled.

In a typical application, both "Low Power" (0.25 mW) and "High Power" (10 mW) RSSI data measurements are recorded, to completely determine a system's cellular topology. The "Low Power" measurements are useful in determining co-located base station relationships (i.e. base stations that belong to the same cell). Whereas, the "High Power" measurements are useful in determining neighbourhood cell relationships.

A system's RSSI Signature primarily captures a "spatial-relationship" perspective of the system. Although co-located base station relationships, may contribute to an RSSI Signature, they are of limited usefulness, without the neighbourhood relationships, since no "geographic movement" will be perceived, between co-located base stations. Consequently, the RSSI Signature will only consist of "High Power" RSSI measurements.

The RSSI receiver sensitivity, varies between different base stations, and has an accuracy of about ±6 dB, in the "High Power" mode, measured at the RSSI saturation level of −35 dBm. The error of ±6 dB, is attributed to power supply variations, between different base stations.

Also, the correlation between an average RSSI attenuation of ±6 dB and the corresponding shift (base station movement) in distance, tends to average:

1. Between about 1.0 to 3.0 metres, at base station distances of 15.0 metres or less, as would generally be the case for base stations in the same cell. This should not be considered a significant base station movement, since base stations, must be spaced at least 1.0 metre apart, within the same cell.

2. Between about 5.0 to 10.0 metres, at base station distances of 15.0 metres or greater as would generally be the case for base stations in neighbourhood cells. This could be considered a significant base station movement, although not necessarily.

The simplest and most straight forward approach, to comparing two sets of corresponding vectors for equality, is to compare each acquired "test" element, against its corresponding "standard" element. Then an overall "match" could be declared, if a sufficient number of the acquired "test" elements, are within an acceptable range of the corresponding "standard" elements.

However, a more effective approach utilizes the "least-square-mean-error" method of determining the degree of "mismatch" between the initial RSSI Signature vector created during the system initialization, and the later RSSI Test vector obtained after a power interruption. The "error" between these two vectors is represented by:

$$|\epsilon_{RSSI}|^2 = |RSSI_{(Signature\ Vector)} - RSSI_{(Test\ Vector)}|^2$$

By using the squared magnitude of the difference between these two vectors, large errors are accentuated compared to small errors, thus giving a more effective result.

The resulting relationship is of the form:

$$|\epsilon_{RSSI}|^2 \leq N \times |K_{(maximum\ RSSI\ deviation)}|^2$$

where: N is the number of base stations or CFP's 10 recording a test signal transmitted by the designated CFP 10 under control of the CCU 14; and $K_{(maximum\ RSSI\ deviation)}$ is a constant that represents the largest degree of RSSI measurement "mismatch", beyond which it would be assumed there had been a "geographic movement" of the system.

From the above discussion as well as empirical measurements, it has been found that a maximum RSSI deviation (the "K" value defined above) of about ±7 dB, on a per element (base station) basis, is a reasonable criteria for determining that at least one, of a pair of base stations (a Signature Transmitter and Signature Receiver pair), has been geographically moved.

A ±7 dB range, will exhibit the following features:

1. It should tolerate the replacement of defective base stations, without adversely causing RSSI Vectors to "mismatch", and incorrectly disabling a system; and 2. It should tolerate the movement of base stations, within the same cell (that is, for co-located base stations), without adversely causing RSSI Vectors to "mismatch", and incorrectly disabling a system; and 3. It should adequately detect "geographic movement" of base stations (to within ±10.0 metres or less), in neighbouring cells, which form the primary components of the RSSI Vectors and correspondingly, the system's RSSI Signature.

The actual values of upper and lower bounds, can be empirically tuned, and generally need to incorporate a reasonable margin of error.

Finally, an empirical determination can be made of the number of element "mismatches", that will constitute an RSSI Vector "mismatch" and correspondingly, the number of RSSI Vector "mismatches", from the entire RSSI Signature Matrix, that will constitute a "disablement test" failure, and thus warrant a system disablement.

It will be evident that there is a practical limit to the minimum size of any PCS system, which would effectively detect geographical movement of the system by this mapping technique. In general, systems with only a few cells would not provide adequate RSSI data to ensure the FCC disabling requirements would be met in every instance.

However, any PCS system with more than a few cells would be almost impossible to move without some significant change in the RSSI map and hence able to fully meet such requirements. For small systems, alternate safeguards could be employed such as a requirement that these mini-systems would automatically disable and must be reverified after the disconnection of any of the CFPs 10 from the CCU 14.

One of the UTAM requirements is that any PCS system not transmit for more than one minute without location verification. It has been found that for larger systems, a maximum of ten CFPs 10 provides sufficient test data for the initial RSSI Signature and the subsequent RSSI Test, for a highly reliable topology verification process. This data can be readily obtained within the one minute time limit.

To safeguard against unauthorized relocation of any PCS system, a 24 digit software password obtained by an authorized representative, is entered into the CCU 14, once the system location has been coordinated. Whenever the system is automatically disabled as a result of the topology verification process, a different password must be entered before the system can be reactivated. This ensures that the requirement, for coordination for a new location be verified by UTAM, Inc., can be fully met.

What is claimed is:

1. A topology verification process for a Personal Communication Services (PCS) system which includes a plurality of Cordless Fixed Parts (CFP)s each for transmitting and receiving signals therefrom, comprising the steps of:

a) transmitting a test signal from a selected one of the plurality of CFPs;

b) measuring the Received Signal Strength Indication (RSSI) of the transmitted test signal received by each of the other CFPs to provide a RSSI vector for each CFP;

c) selecting other ones of the plurality of CFPs and repeating steps a) and b);

d) mapping the spatial relationships of the CFPs relative to each other from the RSSI vector measurements;

e) repeating steps a) to d) in response to selected criteria; and f) comparing the most recent mapped spatial relationships with the initial mapped spatial relationships, to detect changes in the topology of the CFPs in the system, which is highly indicative of a change in geographic area of operation of the PCS system.

2. A process as defined in claim 1, further comprising the step of:

g) disabling operation of the CFPs when predetermined changes in the topology of the PCS system are detected.

3. A process as defined in claim 2, in which the PCS system further includes a Central Controller Unit (CCU) for enabling operation of the CFPs only after entry of a password into the CCU, further comprising the step of:

h) after disabling operation of the CFPs in step g), reenabling operation of the CFPs only after entry of an alternate password into the CCU.

4. A process as defined in claim 2, in which the PCS system further includes a Central Controller Unit (CCU) for configuring the PCS system, further comprising the steps of:

h) recording the mapped spatial relationships of the CFPs in the CCU.

5. A process as defined on claim 4 in which the PCS system further comprises the steps of:

i) recording the results of the initial mapped spectral relationships of up to a maximum sample number of CFPs as a RSSI Signature;

j) recording the results of the most recent mapped spectral relationships of the same CFPs as a RSSI Test Signature; and k) comparing the two Signatures, to detect the changes in the topology of the system.

6. A process as defined in claim 2, in which the PCS system further includes a plurality of Cordless Portable Parts (CPP)s, further comprising the steps of:

h) inhibiting signal transmission from any CPP that is not receiving control signals from one of the CFPs; and i) inhibiting signal transmission from any CFP that is not receiving control signals from the CCU.

7. A method for controlling disablement of a Personal Communication Services system, which includes a plurality of base stations that communicate with a plurality of portable handsets, the method comprising the steps of:

a) measuring and recording the received signal strength of test signals transmitted in turn by each base station, that is received by the other base stations;

b) repeating the measuring and recording step in response to selected criteria; and c) comparing earlier recorded received signal strengths with the most recent recorded received signal strengths; and d) disabling operation of the Personal Communications Services system when predetermined differences in the recorded received signal strengths are detected.

* * * * *